March 23, 1926.  
J. P. JOURDAN  
FRUIT PRESS  
Filed April 13, 1925  
1,578,037
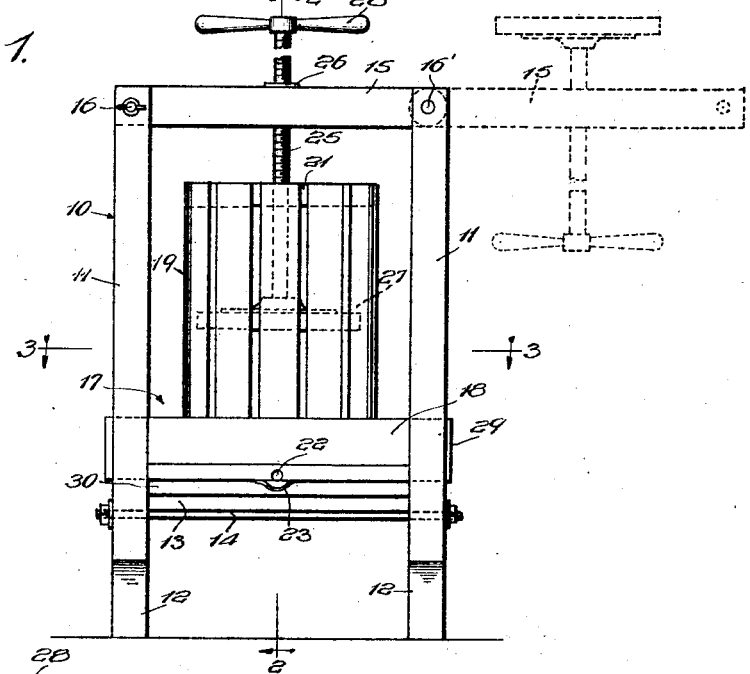
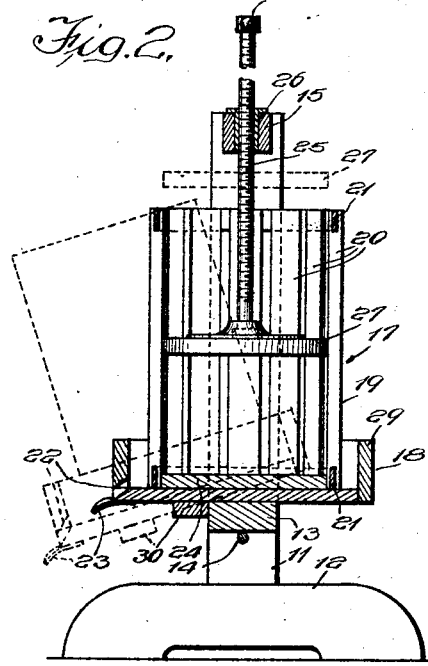
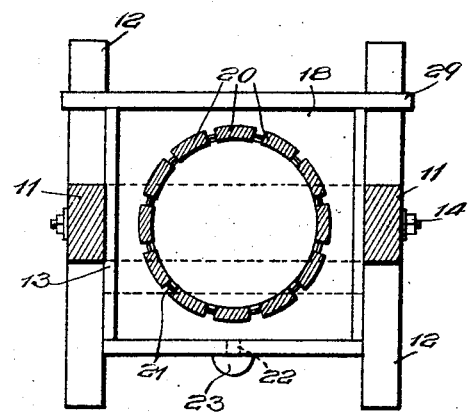
Witnesses:  
William P. Kilroy  
Harry R. White  
Inventor:  
John P. Jourdan  
Edward Fay Wilson  
Atty.

Patented Mar. 23, 1926.

1,578,037

UNITED STATES PATENT OFFICE.

JOHN P. JOURDAN, OF CHICAGO, ILLINOIS.

FRUIT PRESS.

Application filed April 13, 1925. Serial No. 22,683.

*To all whom it may concern:*

Be it known that I, JOHN P. JOURDAN, a citizen of the United States, and resident of Chicago, in the county of Cook and State of Illinois, have invented certain new and useful Improvements in a Fruit Press, of which the following is a specification.

My invention relates to improvements in fruit presses in which the juice of the fruit can be pressed out.

The object of my invention is to provide a press for the purpose specified, provided with a fruit container which can be arranged for freely placing the fruit therein, which can be as readily arranged for the pressing operation, and which when in position to be filled will be maintained in a substantially upright, though slightly inclined, position.

A further object of my invention is to provide a press for the purpose specified which can be readily arranged to permit the placement upon the top of the fruit container, of a suitable fruit crusher or shredder, adapted to deliver the crushed fruit and the juices thereof directly into the container.

Further advantageous features and benefits will become clear from the following description taken in conjunction with the accompanying drawings forming part of this specification and in which:—

Figure 1, is a front elevation of a press made in accordance with my invention;

Figure 2, is a vertical, central section on the line 2—2 of Figure 1, and showing the container in filling position in dotted lines; and Figure 3, is a horizontal section on the line 3—3 of Figure 1.

In said drawings, 10 illustrates a framework made up of vertical side posts rising at each side from a suitable base 12. The side posts are connected above their lower ends by a crossbar 13 extending between the posts and a through tie-rod or bolt 14 and at their upper ends by a crossbar 15 which is secured at its ends to the upper ends of the posts by bolts 16 and 16'.

The lower crossbar serves as a support for the fruit container 17 which comprises a pan-like bottom or base 18, adapted to rest directly upon the bar 13 and an open topped barrel-like fruit cage 19, built up of a number of slats or staves 20, removably held together by means of hoops 21 inserted into the ends of the slats or staves. The container is an open work cage from which the fruit juices can readily escape, during the pressing operation, into the base 18. The base is provided at its front with a drain hole 22 and I preferably provide an extending lip 23 below the drain hole to cause the escaping juices to drop off of the base and not seep back beneath same. The container 19 is centered by means of a centering block 24 secured centrally within the pan 18.

In the upper crossbar 15 I mount a vertical pressure screw 25 which is threaded through a suitable nut 26 fixed in said crossbar. The screw carries a head 27 on its lower end with which the crushed fruit placed in the container is pressed down. On the upper end of the screw 25 I provide a suitable handle 28 for use in forcing the screw 25 and head 27 down upon the fruit.

When it is desired to place the crushed fruit in the container the container with the base 18 can be drawn forward to a position where it can be tipped forward, as shown in dotted lines, Figure 2. To prevent the base being drawn off of the bar 13, I make the rear wall 29 of the base long enough to project beyond the sides of the base and adapted to engage the posts 11, as shown in dotted lines in Figure 2. For readily placing the container centrally below the pressure screw when the container is returned to its operative position, I provide a stop 30 on the bottom of the base arranged to strike the front side of the crossbar 13.

It is sometimes desirable to place a suitable fruit crusher or shredder directly upon the container for preliminarily crushing the fruit and dropping it directly into the container. To make it convenient to do this I make the bolt 16 removable and I round the other end of the crossbar 15 so that the crossbar 15 with the screw 25 can be readily swung over out of the way, as shown in dotted lines, Figure 1, thus leaving the top of the container clear of obstructions for the reception of a crushing device.

It will be seen that during the filling of the container, either when in upright position or when tipped forward, the free juice can readily drain out through the drain opening 22 into a suitable receiving vessel which can be placed below same. Likewise when the fruit has been placed in the container and the press is operated the juice collects in the base from which it drains out through the opening 22. The container can be readily lifted out of the base and taken apart in the usual manner for cleaning and the base can be readily removed when the crossbar 15 is swung back.

My press is very readily and conveniently operated and can be built at a relatively low cost.

As many modifications of my invention will readily suggest themselves to one skilled in the art, I do not limit or confine my invention to the specific details of construction and operation herein shown and described.

I claim:

1. In a fruit press, an open frame having a support above its lower end, a container pan or base loosely mounted on the support, an open topped fruit container on the base, a pressure screw and head carried by the frame above the normal operative position of the fruit container, the base and container being freely movable forward on the support from beneath the screw and head to afford free access to the container, the base being free to be tilted down in its forward position, and means for retaining the base against removal from the frame and for limiting the tilting thereof.

2. In a fruit press, an open frame having a support above its lower end, a container pan or base loosely mounted on the support, an open topped fruit container on the base, a pressure screw and head carried by the frame above the normal operative position of the fruit container, the base and container being freely movable forward on the support from beneath the screw and head to afford free access to the container, means for limiting the forward movement of said base and the base being capable of being freely tilted down in its forward position.

3. In a fruit press, an open frame having a support above its lower end, a container pan or base loosely mounted on the support, an open topped fruit container on the base, a pressure screw and head carried by the frame above the normal operative position of the fruit container, the base and container being freely movable forward on the support from beneath the screw and head to afford free access to the container, means for limiting the forward and backward movements of said base and the forward limiting means permitting the base to be tilted down when at its forward position.

4. In a fruit press, an open frame having a support above its lower end, a container pan or base loosely mounted on the support, an open topped fruit container on the base, a pressure screw and head carried by the frame above the normal operative position of the fruit container, the base and container being freely movable forward on the support from beneath the screw and head to afford free access to the container, and a crossbar at the rear of the base adapted to engage the frame as the base is moved forward to limit the forward movement of the base.

In testimony whereof, I have hereunto set my hand, this 1st day of April, 1925.

JOHN P. JOURDAN.